US011264222B2

(12) United States Patent
Uhlmeyer et al.

(10) Patent No.: US 11,264,222 B2
(45) Date of Patent: Mar. 1, 2022

(54) SAMPLE TRANSFER LINE HEATING SYSTEM AND METHODS OF SAMPLE TRANSFER

(71) Applicant: Elemental Scientific, Inc., Omaha, NE (US)

(72) Inventors: Kyle W. Uhlmeyer, Omaha, NE (US); Tyler Yost, Omaha, NE (US); Jacob Unnerstall, Omaha, NE (US); Aaron Williams, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 11 days.

(21) Appl. No.: 16/993,832

(22) Filed: Aug. 14, 2020

(65) Prior Publication Data

US 2021/0050203 A1 Feb. 18, 2021

Related U.S. Application Data

(60) Provisional application No. 62/886,939, filed on Aug. 14, 2019.

(51) Int. Cl.
*H01J 49/04* (2006.01)
*H01J 49/10* (2006.01)
*G01N 1/44* (2006.01)

(52) U.S. Cl.
CPC ............ *H01J 49/0468* (2013.01); *G01N 1/44* (2013.01); *H01J 49/0431* (2013.01); *H01J 49/105* (2013.01)

(58) Field of Classification Search
CPC .. H01J 49/0468; H01J 49/0431; H01J 49/105; G01N 1/44
USPC ....... 250/288, 440.11, 441.11, 442.11, 443.1
See application file for complete search history.

(56) References Cited

U.S. PATENT DOCUMENTS 3,098,717 A 7/1963 Ferrari, Jr. et al.
2005/0063865 A1 3/2005 Bonne et al.
2006/0230845 A1 10/2006 Eiteneer et al.
2008/0003649 A1* 1/2008 Maltezos ............. G01N 21/645 435/91.2
2012/0198912 A1 8/2012 Ewing et al.
2014/0073013 A1* 3/2014 Gorman .................... B01L 7/52 435/91.2
2018/0229149 A1* 8/2018 Spiegelman ........ C23C 16/4485

FOREIGN PATENT DOCUMENTS

KR 20170070023 A 6/2017

OTHER PUBLICATIONS

PCT International Search Report and Written Opinion for Application No. PCT/US2020/046385, dated Nov. 13, 2020.

* cited by examiner

*Primary Examiner* — Nicole M Ippolito
(74) *Attorney, Agent, or Firm* — Kevin E. West; Advent, LLP

(57) ABSTRACT

Systems and methods are described for heating sample transfer lines between a source of a sample and a detection system to detect analytes of interest in the sample, where the sample is maintained in a heated state to maintain dissolved analytes of interest in solution.

20 Claims, 3 Drawing Sheets

SAMPLE TRANSFER LINE HEATING SYSTEM AND METHODS OF SAMPLE TRANSFER

CROSS-REFERENCE TO RELATED APPLICATIONS

The present application claims the benefit of 35 U.S.C. § 119(e) of U.S. Provisional Application Ser. No. 62/886,939, filed Aug. 14, 2019, and titled "SAMPLE TRANSFER LINE HEATING SYSTEM." U.S. Provisional Application Ser. No. 62/886,939 is herein incorporated by reference in its entirety.

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for heating sample transfer lines between a source of a sample and a detection system to detect analytes of interest in the sample are described, where the sample is maintained in a heated state to maintain dissolved analytes of interest in solution. A method embodiment includes, but is not limited to, receiving a fluid sample from a sample source into a heated fluid transfer system, the heated fluid transfer system including a fluid line configured to transfer the fluid sample, a linear heating element longitudinally arranged proximate at least a portion of the fluid line, a power supply coupled with the linear heating element and configured to supply power to the linear heating element, and a controller coupled with the power supply, the controller having a temperature setpoint associated with the linear heating element, the controller configured to regulate supply of power to the linear heating element based on the temperature setpoint; heating the fluid sample above ambient temperature via the linear heating element; and transferring the fluid sample through the fluid line at a flow rate of less than one liter per minute.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Overview

Figure 1:
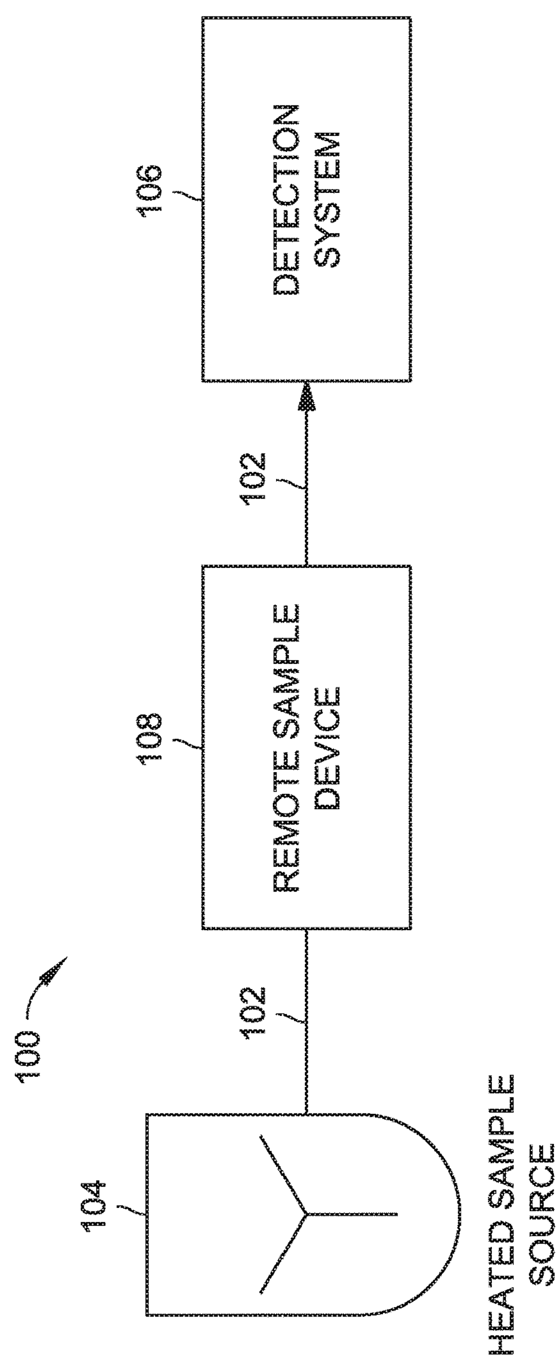
FIG. 1 is a schematic illustration of a sample transfer heating system in accordance with example implementations of the present disclosure.

For many systems, fluids are maintained at a temperature or temperatures above ambient temperature conditions, such as in a holding tank, a fluid conduit, or other vessel. The higher temperatures can facilitate dissolving certain chemical species to keep the chemical species in solution until needed for processing. Many chemical species have a higher solubility at higher temperatures as compared to the solubility at lower temperatures. Maintaining the fluid holding the chemical species above ambient temperatures can therefore permit more chemical species to be dissolved in the heated fluid than compared to the fluid at ambient temperatures. For semiconductor fabrication, certain etching techniques can be utilized to chemically remove layers of a semiconducting wafer with precise control dependent on the concentration of chemical species in the etchant (e.g., silicon). For example, with nitride semiconducting wafers, the nitride film can be precisely etched without damaging the other components or layers. Such etching can be facilitated by a wet etching process using hot phosphoric acid (e.g., phosphoric acid ($H_3PO_4$) having a temperature from about 150° C. to about 180° C.), where the etch rate is dependent upon the concentration of silicon in the hot phosphoric acid. Control of the timing of the etching processes can therefore depend on precise control of the amount of silicon in the phosphoric acid. Too much silicon in the phosphoric acid can substantially slow or essentially stop the etch rate, whereas too little silicon in the phosphoric acid can cause the etch rate to be too fast, potentially damaging the device being fabricated. Further, the concentration of silicon in the hot phosphoric acid can change over time, since the etching process itself adds silicon to the phosphoric acid bath, thereby altering the silicon concentration.

Removing a sample fluid from a heated source of fluid for detection of analytes of interest can cause the sample fluid to cool due to exposure to ambient conditions, reducing the temperature of the fluid during transit to a detection system to detect the analytes of interest. If the sample fluid cools significantly, analytes of interest can precipitate out of the sample fluid, which can cause an erroneous analysis of the analytes by the detection system. For instance, the detection system can provide an indication that a lower concentration of analytes of interest are present in the sample fluid than are actually present in the sample fluid in the heated source of fluid due to a decreased ability to measure the precipitated portions, due to separation of the fluid from the precipitated portions prior to analysis, or the like.

Similarly, some fluids can be maintained in a holding tank or supply line that agitates the fluids to keep certain chemical species in solution (e.g., via gas introduction, mechanical stirring, sonication, or the like). Such holding tanks or supply lines may or may not be heated above ambient conditions, depending on the chemical species present, the solvent in use, processing conditions, and the like. Heated sample transfer systems may provide a heated environment for sample transfer that risks vaporization of sample fluids, particularly where differences in temperature between the conditions of the holding tank or supply line and a sample conduit are improperly matched or heat the sample fluid too quickly. Such sudden vaporization can pose dangerous process conditions, such as via risk of explosion, risk of toxic vapor production, or the like. Samples removed from the agitated environment may have analytes of interest precipitate out of the sample fluid during transfer to a sampling system or detection system due to lack of conditions that support maintaining chemical species in solution during transfer.

In some instances, a sample can be transferred at a high volumetric flow rate through an insulated conduit to reduce the amount of heat of a heated sample lost to the ambient environment or to induce turbulence within the sample during transfer. However, such high volumetric flow rates can provide samples that are not representative of environments in which sample preparation systems will prepare a sample for analysis by an analytic detector. For instance, such sample preparation systems can operate at flow rates at orders of magnitude less than the high flow rates used to avoid heat loss during transfer. Further, such high volumetric flow rates typically utilize large volumes of fluid pumped at the high volumetric flow rates, which generates substantial waste of sample fluid and increased operational costs. As such, high volumetric flow rate systems are unsuitable for small volume samples or for non-continuous samples.

Accordingly, the present disclosure is directed to systems and methods for heating sample transfer lines between a source of a sample and a detection system to detect analytes of interest in the sample. A heated transfer line can include a fluid line (e.g., a tube or other conduit through which fluid can flow) and a temperature-controlled wire system longitudinally positioned adjacent at least a portion of the fluid line. The temperature-controlled wire system can maintain the temperature of fluid flowing through the fluid line above ambient temperature conditions to maintain analytes of interest dissolved in the fluid. The heated transfer line can support low volumetric flow of samples and non-continuous sample (e.g., sample segments) during transfer while maintaining analytes of interest dissolved in the fluid. The heated transfer line can include segments coupled together to provide modular increases in length of the heated transfer. Each segment can include common or separate power supplies and controllers to control resistive heating of the wire within each the segment. Each segment can also include a thermal shutoff controller to restrict flow of electricity through the wire if the temperature of the wire achieves a threshold temperature. In implementations, at least a portion of the temperature-controlled wire system is held in place against the fluid line via a securing layer. The heated transfer line can also include an insulation layer to separate the temperature-controlled wire system and fluid line from the ambient environment. For example, the insulation layer can substantially enclose the wrapped temperature-controlled wire system, the securing layer, and the fluid line.

In implementations, the heated transfer line provides for gradient-based heating of a sample during transfer. For example, a first segment of the heated transfer line can have a first temperature and a second segment of the heated transfer line can have a second temperature to gradually heat or cool a sample during transit through the fluid line of the heated transfer line. In an aspect, the gradient heating can prevent the sample fluid from experiencing substantial temperature differences between transit from the initial holding tank or supply line to a remote sampling system, analytic detector, and combinations thereof, which can prevent dangerous vaporization conditions of sample fluids.

In the following discussion, example implementations of techniques for heating sample transfer lines are presented.

Example Implementations

Referring generally to FIGS. 1, 2, 4A, and 4B, a sample transfer heating system ("system 100") is shown. The system 100 generally includes a heated transfer line 102 that couples between a sample source 104 and a detection system 106 to transfer a sample fluid from the sample source 104 to the detection system 106 or portions between the sample source 104 and the detection system 106. In implementations, the heated transfer line 102 is coupled between the sample source 104 and a remote sampling device 108, which in turn is coupled between the sample source 104 and the detection system 106. For instance, the remote sampling device 108 can receive the sample fluid from the sample source 104 via the heated transfer line 102, optionally modify the sample fluid (e.g., via dilution, standard chemical addition, or the like), and further transfer to the detection system 106 via another heated transfer line 102. For example, the remote sampling device 108 can use a pressurized gas or working fluid to push the sample fluid to the detection system 106. The sample source 104 can include a sample fluid that is maintained under conditions that facilitate maintaining chemical species of interest in solution, such as through maintaining the sample fluid at a temperature above ambient conditions, agitating the sample fluid, or combinations thereof. For example, the sample source 104 can heat the sample fluid above 30° C. For highly viscous fluids, such as concentrated acids, maintaining the fluids at elevated temperatures can facilitate transfer of the fluids due to decreased viscosity of the fluids at the elevated temperatures. In implementations where the sample source 104 is a source of phosphoric acid, the sample source 104 can maintain the sample fluid from about 140° C. to about 180° C. The detection system 106 includes any system suitable to detect an analyte of interest in the sample obtained from the sample source 104 and transferred through the heated transfer line 102. For example, the detection system 106 can include, but is not limited to, Inductively Coupled Plasma (ICP) spectrometry instrumentation (e.g., an Inductively Coupled Plasma Mass Spectrometer (ICP/ICP-MS), an Inductively Coupled Plasma Atomic Emission Spectrometer (ICP-AES), or the like).

The heated transfer line 102 couples between the sample source 104 and the detection system 106 to transfer sample fluid between at least a portion of the distance between the sample source 104 and the detection system 106. For example, the transfer line 102 can traverse the full distance between the sample source 104 and the detection system 106 or a portion thereof (e.g., between the sample source 104 and the remote sampling device 108, between the remote sampling device 108 and the detection system 106, or the like). The sample source 104 can be remote from the remote sampling device 108, displaced therefrom by various distances (e.g., 1 m, 5 m, 10 m, 50 m, etc.). The sample source 104 can be remote from the detection system 106, displaced therefrom by various distances (e.g., 1 m, 5 m, 10 m, 50 m, 100 m, 1000 m, etc.). The heated transfer line 102 can be a portion of a sample handling system to transfer sample fluid automatically from the sample source 104 to the detection system 106 over the entire distance between the sample source 104 and the detection system 106 (e.g., without manual operator action, such as an individual carrying the sample a portion of the distance).

Figure 2:
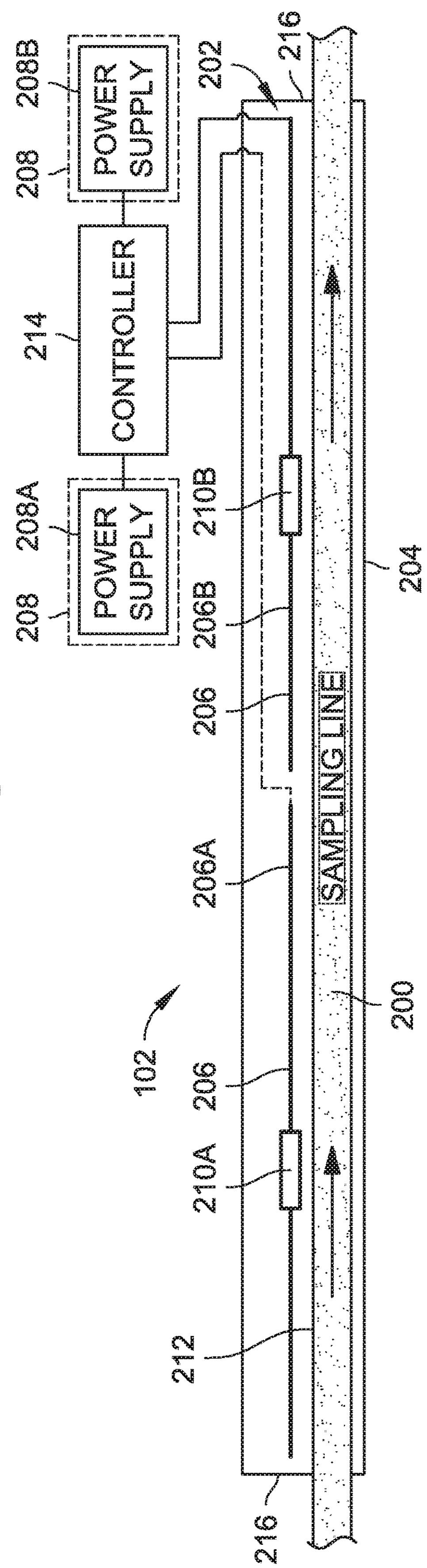
FIG. 2 is a schematic illustration of a heated transfer line of a sample transfer heating system in accordance with example implementations of the present disclosure.

Referring to FIG. 2, the heated transfer line 102 is shown in accordance with an example implementation. As shown, the heated transfer line 102 generally includes a fluid line 200, a linear heating element (e.g., temperature-controlled wire system 202), and an insulation layer 204. The fluid line 200 can include, for example, a tube or other conduit to contain a flowing sample fluid to transfer the sample fluid from the sample source 104 to the detection system 106 or portions therebetween (e.g., from the sample source 104 to the remote sampling device 108). In an example implementation, the fluid line 200 is constructed from a perfluoroalkoxy alkane (PFA) material to facilitate handling of corrosive substances, although the type of material utilized can be selected based on the type of fluid(s) to be sampled. Alternatively or additionally, the fluid line 200 can include a stainless metal alloy material (e.g., braided stainless steel) with a ceramic linear heating element coupled to at least a portion of the stainless metal alloy material for heat distribution.

The linear heating element is positioned in proximity to the fluid line 200 to heat or maintain the temperature of sample fluid flowing through or being held within the fluid line 200. For example, the temperature-controlled wire system 202 can maintain the temperature of fluid flowing through or being held within the fluid line 200 above ambient temperature conditions to maintain analytes of interest dissolved in the sample fluid. In implementations, at least a portion of the temperature-controlled wire system 202 physically contacts at least a portion of the fluid line 200. During a sample transfer process, a sample fluid may be held within the heated transfer line 102 for a period of time (e.g., where no pressure source, such as a pressurized gas, a pump, a vacuum, or the like, is acting upon the fluid therein). The heated transfer line 102 can maintain the temperature of the sample fluid during this holding period to prevent or otherwise reduce the amount of precipitation of analytes within the sample fluid while the sample fluid is held.

The temperature-controlled wire system 202 include one or more metallic wires 206 traversing the heated transfer line 102 longitudinally with the fluid line 200. In implementations, the wires 206 are positioned proximate an outer surface 212 of the fluid line 200 to prevent contact between the wires 206 and fluids within the fluid line 200. In implementations, at least a portion of the temperature-controlled wire system 202 physically contacts the outer surface 212 of the fluid line 200. In implementations, the wires 206 are maintained at a temperature from about 30° C. to about 200° C. In implementations, the wires 206 are maintained at a temperature from about 50° C. to about 200° C. For example, the wires 206 can be maintained at a temperature from about 100° C. to about 140° C. The wires 206 can be constructed from, but are not limited to, nichrome or other metallic alloy or alloys having a controllable resistance to electricity to achieve a desired temperature to heat the fluid line 200 and the sample fluid flowing therethrough. Alternatively or additionally, one or more portions of the wires 206 can be constructed from non-metallic conductive materials that generate heat responsive to flow of electricity therethrough (e.g., via resistive heating).

The heated transfer line 102 can include multiple segments coupled together to form a longitudinal system to heat the fluid line 200 and maintain the temperature of the sample fluid therein above ambient temperatures to prevent precipitation of analytes of interest within the fluid line 200 during transit or holding within the fluid line 200. For example, the temperature-controlled wire system 202 is shown including having a first segment including a first wire 206A and a second wire 206B. The wires 206A and 206B are coupled with a power supply 208 and controller 214 to control the flow of electricity through the wires 206A and 206B. The power supply 208 and the controller 214 can include single elements or multiple elements to facilitate power supply and controller functionality. For instance, the power supply 208 can include a first power supply 208A to provide power for resistive heating of the first wire 206A and can include a second power supply 208B to provide power for resistive heating of the second wire 206B. Alternatively or additionally, the power supply 208 can include a single power supply to flow electricity through multiple wire segments (such as through duty cycling or the like). The controller 214 can be integrated in the power supply 208 or can be included in a separate portion of the system 100 to regulate the supply of electricity through the wires 206, which in turn controls the temperature of the wires 206 through resistive heating. In implementations, the power supply 208 includes 110-220V alternating current (AC) power supplies.

The segments of the heated transfer line 102 can include electrical couplings to supply power to additional segments added onto the end of powered segments to supply power through the powered segments to the additional segments. Alternatively or additionally, additional segments of the heated transfer line can be coupled to ends of other segments, where each segment can include individual wires 206, power supplies 208, controllers 214, fluid lines 200, insulation layers 204, and the like. For example, one or more additional segments of a heated transfer line 102 can be coupled to one or both ends 216 of the first segment shown in FIG. 2 to extend the longitudinal length of temperature control provided to the fluid line 200. The second segment can include different temperature setpoints (e.g., via control by the controller 214) than the temperature(s) of the wires 206 associated with the first segment of the heated transfer line 102, which can establish a gradient heating pattern a fluid experiences during flow through the fluid line. The system 100 can therefore provide modular additions to the heated transfer line 102 to provide additional lengths as needed to accommodate individualized layouts of physical space between the sample source 104 and the remote sampling device 108, between the remote sampling device 108 and the detection system 106, or the like.

The heated transfer line 102 can include one or more thermal shutoff controllers (controllers 210A and 210B are shown). The thermal shutoff controllers can include or can be in communication with a temperature sensor to detect a temperature of the wires (e.g., first wire 206A, second wire 206B, etc.). The thermal shutoff controllers can restrict, reduce, or otherwise prevent the flow of electricity through the wires 206 if the temperature of the wire 206 exceeds a threshold temperature. In implementations, the thermal shutoff controllers restrict, reduce, or otherwise prevent the flow of electricity through the wires 206 if the current temperature of the wire is 30 degrees C. or greater above the temperature setpoint established by the controller 214. In an example implementation, the wires 206 are maintained at a temperature of about 120° C. and the thermal shutoff controller prevents the flow of electricity through the wires 206 if the temperature of the wire 206 exceeds about 150° C.

The wires 206 are positioned within the insulation layer 204 in proximity with the fluid line 200 such that heat generated by the resistive heating of the wires 206 is transferred through the fluid line 200 into the fluid(s) flowing therethrough. In implementations, at least a portion of the wires 206 are secured against and in physical contact with the fluid line 200 (e.g., against the outer surface 212) via a securing layer. The securing layer can include, for example, a heat shrink material to conform about the wires 206 and secure the wires 206 against the fluid line 200. For example, the securing layer can define a tubular shape in which the fluid line 200 and the wires 206 pass through the annular portion, where application of heat to the securing layer causes the material of the securing layer to contract about the fluid line 200 and the wires 206. Positioning of the wires 206 in close proximity with the fluid line 200 can facilitate efficient heat transfer from the wires 206 to fluid flowing through the fluid line 200.

The insulation layer 204 separates the fluid line 200 and at least a portion of the temperature-controlled wire system 202 (e.g., the wires 206, the thermal shutoff controllers, the controller 214, the power supply 208, or combinations thereof) from the ambient environment. The insulation layer 204 provides temperature-retaining features to maintain the temperature of the fluid line 200 and also prevents exposure of the wires 206 to individuals or equipment in proximity of the heated transfer line 102. The insulation layer 204 can include, but is not limited to, fiberglass insulation, silicone insulation, or the like, or combinations thereof.

Figure 4A:
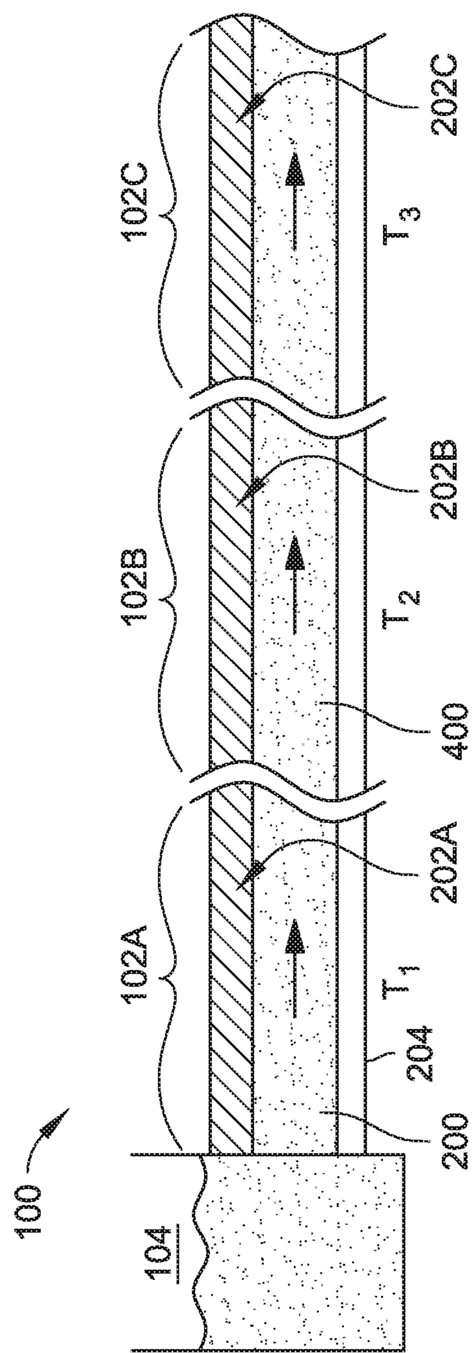
FIG. 4A is a schematic illustration of a system including a plurality of segments of a heated transfer line, with each segment having an individual temperature setpoint control to heat a fluid line having a substantially continuous fluid sample flowing therethrough.
Figure 4B:
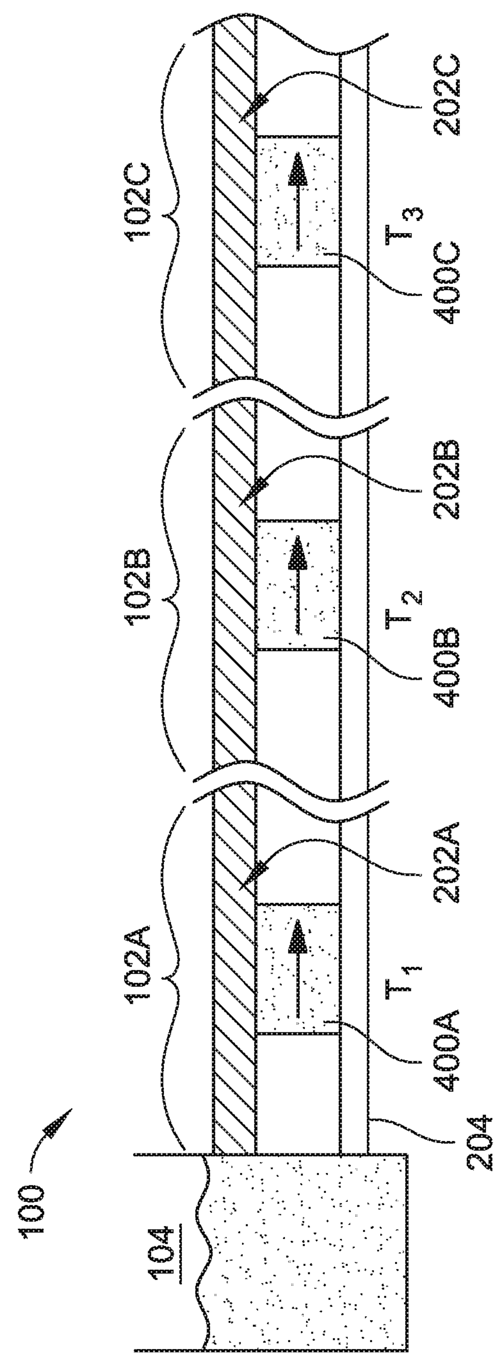
FIG. 4B is a schematic illustration of a system including a plurality of segments of a heated transfer line, with each segment having an individual temperature setpoint control to heat a fluid line having a plurality of fluid sample segments flowing therethrough.

Referring to FIGS. 4A and 4B, example implementations of the system 100 are shown having a plurality of segments of the heated transfer line 102 for receiving and transferring a fluid sample from the sample source 104 through the fluid line 200. The system 100 is shown having three segments (102A, 102B, 102C) of the heated transfer line 102 coupled together to form a continuous flow path for the fluid line 200 to transfer the fluid sample received from the sample source 104. Each segment of the heated transfer line 102 can have a specific temperature setpoint, such that the system 100 can have varying temperature setpoints between the segments 102A, 102B, 102C, or have a consistent temperature across the segments 102A, 102B, 102C. For instance, the segment 102A can have a temperature setpoint (T1) set for the linear heating element 202A of the segment 102A that is the same as or different than a temperature setpoint (T2) set for the linear heating element 202B of the segment 102B that is the same as or different than a temperature setpoint (T3) set for the linear heating element 202C of the segment 102C. In implementations, the temperature setpoints for each of the segments are dynamically updatable by the system 100. For example, the system 100 can include one or more communication pathways to update the temperature setpoints for each of the segments on a dynamic basis through control by the controller(s) 214. In implementations, the temperature setpoints can be updated by a user, such as through a user interface associated with the heated transfer line 102 or other portion of the system 100.

In implementations, the system 100 can provide gradient-based heating of fluid 400 flowing through the fluid line 200. For example, the system 100 can include at least one temperature setpoint of the segments that differs from one or more other segments (e.g., segment 102A has a temperature setpoint that differs from one or more of segment 102B or 102C) to provide gradient-based heating of the fluid 400 flowing through the fluid line 200. Such gradient based heating can provide a gradual increase or decrease in temperature experienced by the fluid 400 during transit. For example, the system 100 can provide a gradual increase in temperature for the fluid by having temperature setpoints for segments closest to the sample source 104 at or near the temperature that the sample source 104 maintains the fluid during storage/supply. By providing gradual temperature increases (e.g., temperature differences of not more than 10° C.) between the sample source 104 and the segment 102A or between segments, the system 100 can prevent sudden vaporization of the fluid 400 during transit, where vaporization can pose dangerous process conditions, such as via risk of explosion, risk of toxic vapor production, or the like.

In implementations, the system 100 can provide low volume throughput of sample through the heated transfer line 102 while maintaining analytes of interest dissolved in solution. The samples can include, for example, fluid samples of concentrated acids (e.g., acids having an acid concentration of at least 50% w/w). The concentrated acid can include, but is not limited to, concentrated phosphoric acid, concentrated sulfuric acid, concentrated nitric acid, concentrated hydrochloric acid, concentrated hydrofluoric acid, and combinations thereof. For example, the system 100 can facilitate transfer of sample from the sample source 104 at flow rates of less than about one liter per minute under temperature control to maintain analytes of interest dissolved in solution. In an aspect, the heated transfer line 102 can receive the fluid 400 from the sample source 104 with the pressure of the sample source 104 providing the flow through the fluid line 200 at a flow rate of less than about one liter per minute. In another aspect, the heated transfer line 102 can receive the fluid from the sample source 104 via operation of a low pressure pump to provide a flowrate of less than one liter per minute. In implementations, the system 100 operates at flowrates of less than about 500 milliliters per minute. For example, the system 100 can operate at flowrates of about 475 mL/min, 450 mL/min, 425 mL/min, 400 mL/min, 375 mL/min, 350 mL/min, 325 mL/min, 300 mL/min, 275 mL/min, 250 mL/min, 225 mL/min, 200 mL/min, 175 mL/min, 150 mL/min, 125 mL/min, 100 mL/min, 75 mL/min, 50 mL/min, 25 mL/min, 5 mL/min, and flowrates therebetween. In implementations, the fluid line 200 has a cross-sectional inner diameter of less than about 0.25 inches to support low volumetric flowrates while maintaining analytes of interest dissolved in solution through operation of the linear heating elements (e.g., linear heating elements 202A-202C, temperature-controlled wire system 202, etc.). By utilizing lower volumetric flow rates, the system 100 conserves the amount of sample received from the sample source 104 (e.g., avoiding waste of sample)

and provides process flow conditions that are similar to those utilized by the detection system 106, which can increase data reproducibility and data accuracy as compared to systems that require larger volumetric flow rates of transfer prior to analyzing at the detection system 106. The fluid received from the sample source 104 can be a substantially continuous portion of fluid (e.g., fluid 400 shown in FIG. 4A), a segmented portion of fluid (e.g., fluid segments 400A, 400B, 400C shown in FIG. 4B), or combinations thereof. For example, the fluid segments 400A, 400B, and 400C can be separated from each other by intervening gas portions (as shown in FIG. 4B) or intervening non-sample fluids, such as a working fluid distinct from the sample fluid (e.g., a working fluid received from a source other than the sample source 104, such as a carrier fluid).

Example 1

Samples containing dissolved silicon were heated on a hot plate and transferred through a fluid line for a distance of 10 meters in an unheated transfer line before analysis. A first sample with no additional spike of silicon was analyzed to have a free silicon concentration of 13.381 parts per million (ppm). A second sample with no additional spike of silicon was analyzed to have a free silicon concentration of 13.227 parts per million (ppm). A third sample was spiked with 60 ppm additional silicon and was analyzed to have a free silicon concentration of 36.648 parts per million (ppm). While not wishing to be bound by any particular theory, it is believed that the unheated transfer line allowed the samples to cool during the 10 m transit such that silicon precipitated from solution, providing an inaccurate representation of the amount of silicon present in the samples.

Example 2

Samples containing dissolved silicon were heated on a hot plate and transferred through a fluid line for a distance of 10 meters in a heated transfer line according to the heated transfer line 102 described herein before analysis. A first sample with no additional spike of silicon was analyzed to have a free silicon concentration of 13.381 parts per million (ppm). A second sample with no additional spike of silicon was analyzed to have a free silicon concentration of 13.227 parts per million (ppm). A third sample was spiked with 60 ppm additional silicon and was analyzed to have a free silicon concentration of 69.276 parts per million (ppm). A fourth sample was spiked with 60 ppm additional silicon and was analyzed to have a free silicon concentration of 68.552 parts per million (ppm). A fifth sample was spiked with 60 ppm additional silicon and was analyzed to have a free silicon concentration of 69.013 parts per million (ppm). While not wishing to be bound by any particular theory, it is believed that the heated transfer line prevented substantive precipitation of silicon within the transfer line during the 10 m transit, providing a more accurate representation of the amount of silicon present in the samples as compared to Example 1.

Example 3

Figure 3:
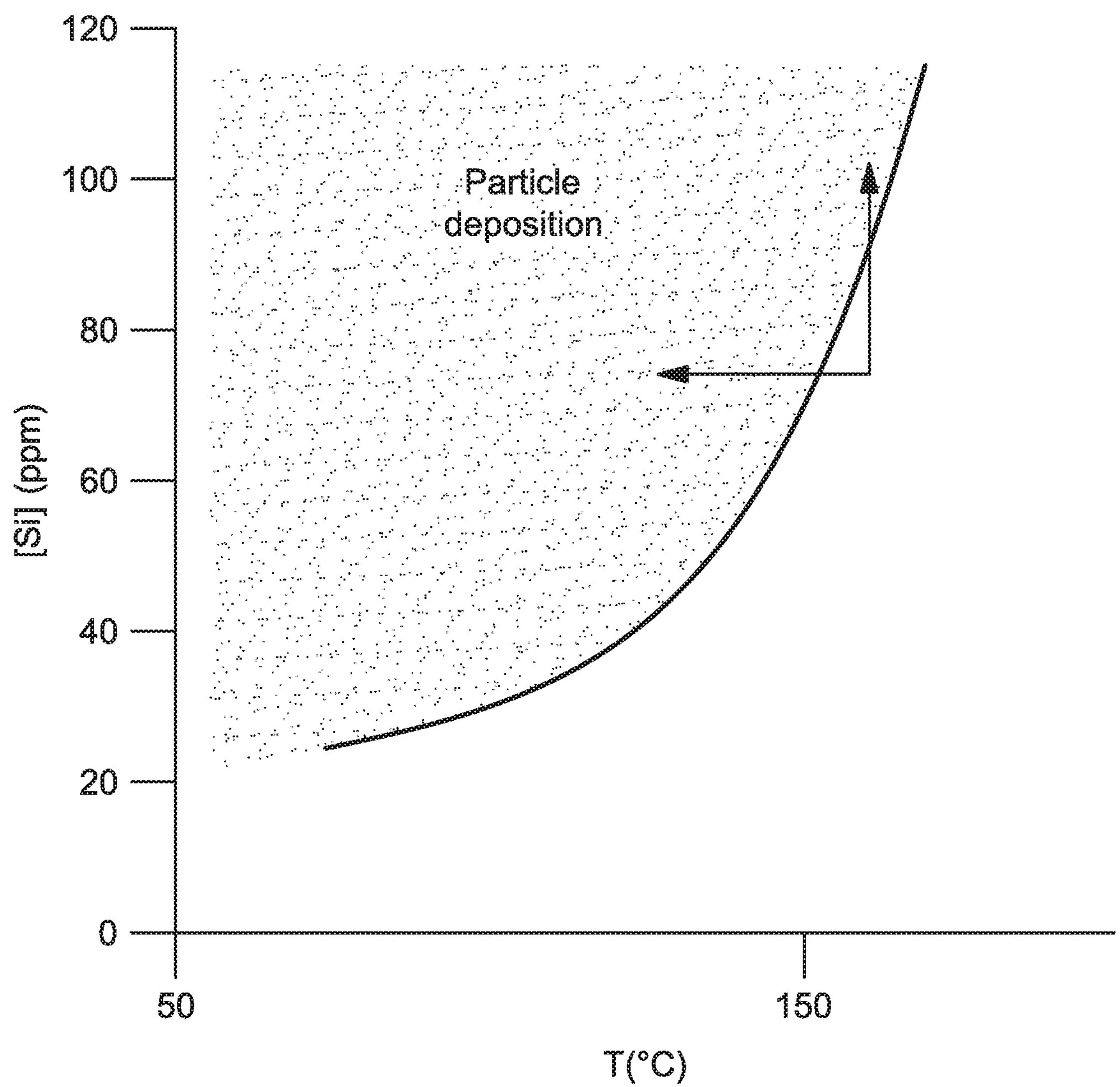
FIG. 3 is a chart of solubility of silicon in phosphoric acid as a function of temperature.

Samples containing dissolved silicon were heated on a hot plate and transferred through a fluid line for a distance of 10 meters in a heated transfer line according to the heated transfer line 102 described herein before analysis. A first sample with no additional spike of silicon was analyzed to have a free silicon concentration of 19.4 parts per million (ppm). A second sample was spiked with 20 ppm additional silicon and was analyzed to have a free silicon concentration of 37.3 parts per million (ppm). A third sample was spiked with 40 ppm additional silicon and was analyzed to have a free silicon concentration of 58.3 parts per million (ppm). A fourth sample was spiked with 60 ppm additional silicon and was analyzed to have a free silicon concentration of 69.0 parts per million (ppm). A fifth sample was spiked with 100 ppm additional silicon and was analyzed to have a free silicon concentration of 65.2 parts per million (ppm). These results suggested that a detection limit of free silicon was about 65 ppm to about 70 ppm, which is consistent to solubility of silicon in phosphoric acid as a function of temperature (shown in FIG. 3).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method of transferring a sample having dissolved chemical analytes of interest under low volumetric flowrate, the method comprising:
- receiving a fluid sample from a sample source into a heated fluid transfer system, the heated fluid transfer system including
  - a fluid line configured to transfer the fluid sample,
  - a linear heating element longitudinally arranged proximate at least a portion of the fluid line,
  - a power supply coupled with the linear heating element and configured to supply power to the linear heating element, and
  - a controller coupled with the power supply, the controller having a temperature setpoint associated with the linear heating element, the controller configured to regulate supply of power to the linear heating element based on the temperature setpoint;
- heating the fluid sample above ambient temperature via the linear heating element; and
- transferring the fluid sample through the fluid line at a flow rate of less than one liter per minute.

2. The method of claim 1, wherein the fluid sample includes a concentrated acid.

3. The method of claim 2, wherein the concentrated acid includes an acid concentration of at least 50% w/w.

4. The method of claim 1, wherein the fluid line has a cross-sectional inner diameter of less than about 0.25 inches.

5. The method of claim 1, wherein transferring the fluid sample through the fluid line at a flow rate less than one liter per minute includes transferring a continuous fluid sample through the fluid line at a flow rate of less than one liter per minute.

6. The method of claim 1, wherein transferring the fluid sample through the fluid line at a flow rate less than one liter per minute includes transferring a segmented fluid sample through the fluid line at a flow rate of less than one liter per minute.

7. The method of claim 6, wherein the segmented fluid sample is separated from another segment fluid sample via an intervening gas portion.

8. The method of claim 6, wherein the segmented fluid sample is separated from another segment fluid sample via an intervening working fluid.

9. The method of claim 1, wherein the heated fluid transfer system includes a plurality of linear heating elements, wherein the controller has an independent temperature setpoint for each linear heating element of the plurality of linear heating elements.

10. The method of claim 9, wherein heating the fluid sample above ambient temperature via the linear heating element includes heating the fluid sample according to a gradient heating pattern.

11. The method of claim 10, wherein the plurality of linear heating elements includes a first linear heating element having a first temperature setpoint and a second linear heating element having a second temperature setpoint, wherein the first temperature setpoint is less than the second temperature setpoint, and wherein the difference between the first temperature setpoint and the second temperature setpoint defines the gradient heating pattern.

12. The method of claim 11, wherein the plurality of linear heating elements includes a third linear heating element having a third temperature setpoint that differs from each of the first temperature setpoint and the second temperature setpoint.

13. The method of claim 10, wherein the gradient heating pattern increases in temperature as the fluid sample travels away from the sample source.

14. The method of claim 1, wherein the linear heating element includes at least one metallic wire longitudinally arranged proximate at least a portion of the fluid line, the at least one metallic wire coupled with the power supply to heat the fluid sample via resistive heating of the at least one metallic wire via operation of the power supply.

15. The method of claim 1, wherein heating the fluid sample above ambient temperature via the linear heating element includes heating the fluid sample to a temperature from about 50° C. to about 200° C.

16. The method of claim 1, wherein heating the fluid sample above ambient temperature via the linear heating element includes heating the fluid sample to a temperature from about 30° C. to about 200° C.

17. The method of claim 1, wherein transferring the fluid sample through the fluid line at a flow rate of less than one liter per minute includes transferring the fluid sample through the fluid line at a flow rate of less than one liter per minute while heating the fluid sample above ambient temperature via the linear heating element.

18. The method of claim 1, wherein the fluid sample includes a concentrated acid.

19. The method of claim 18, wherein the concentrated acid includes an acid concentration of at least 50% w/w.

20. The method of claim 19, wherein the fluid line has a cross-sectional inner diameter of less than about 0.25 inches.

* * * * *